(12) United States Patent
Sato

(10) Patent No.: US 7,025,070 B2
(45) Date of Patent: *Apr. 11, 2006

(54) RESIN COMPOSITION FOR PURGING CONTAMINANT IN THE PLASTIC PROCESSING MACHINE

(76) Inventor: Shigekatu Sato, 3-7-7, Katahira, Asao-ku, Kawasaki-City (JP), T215-0023

( * ) Notice: Subject to any disclaimer, the term of this patent is extended or adjusted under 35 U.S.C. 154(b) by 0 days.

This patent is subject to a terminal disclaimer.

(21) Appl. No.: 10/627,266

(22) Filed: Jul. 24, 2003

(65) Prior Publication Data

US 2004/0132878 A1 Jul. 8, 2004

(30) Foreign Application Priority Data

Aug. 5, 2002 (JP) .................................. H2002-226801

(51) Int. Cl.
*B08B 9/00* (2006.01)

(52) U.S. Cl. ................... 134/22.14; 264/39; 264/176.1; 510/188; 510/465; 510/475; 524/183

(58) Field of Classification Search ............. 134/22.14; 264/39, 176.1; 510/188, 465, 475; 524/183
See application file for complete search history.

(56) References Cited

U.S. PATENT DOCUMENTS

| | | | | |
|---|---|---|---|---|
| 3,316,287 A | * | 4/1967 | Nunn, Jr. et al. | 558/294 |
| 3,539,529 A | * | 11/1970 | Seki | 524/182 |
| 3,645,897 A | * | 2/1972 | Gower et al. | 508/158 |
| 3,804,875 A | * | 4/1974 | Ludwig et al. | 558/289 |
| 4,141,851 A | * | 2/1979 | Askew et al. | 252/78.3 |
| 4,298,488 A | * | 11/1981 | Tanizaki et al. | 252/78.1 |
| 4,450,087 A | * | 5/1984 | Askew et al. | 252/73 |
| 5,236,514 A | * | 8/1993 | Leung et al. | 134/22.14 |
| 5,854,324 A | * | 12/1998 | Tajima et al. | 524/232 |
| 5,948,844 A | * | 9/1999 | Oka et al. | 524/399 |
| 6,235,821 B1 | * | 5/2001 | Saito | 524/161 |

FOREIGN PATENT DOCUMENTS

| | | | |
|---|---|---|---|
| GB | 1090565 | * | 11/1967 |
| JP | 04-252287 | * | 9/1912 |
| JP | 61-083293 | * | 4/1986 |
| JP | 02180941 | * | 7/1990 |

* cited by examiner

*Primary Examiner*—Bernard Lipman
(74) *Attorney, Agent, or Firm*—Butzel Long

(57) ABSTRACT

A resin composition for purging away contaminants in a plastic processing machine and a method of purging contaminants from a plastic processing machine that involves the use of the resin composition. The resin composition includes a thermoplastic resin and borate ester of polyoxyalkylene.

3 Claims, No Drawings

RESIN COMPOSITION FOR PURGING CONTAMINANT IN THE PLASTIC PROCESSING MACHINE

BACKGROUND OF THE INVENTION

1. Field of the Invention

The present invention relates to a resin composition for purging contaminants in a plastic processing machine.

2. Description of the Related Art

Plastics have excellent properties such as easy processability, high productivity, light weight and relative low procuring costs, so they are used for the parts and structural materials for automobiles, autobicycles, scooters, televisions, radios, audio equipment, washing machines, rice cookers, personal computers, portable telephones, game machinery, building materials, office supplies, stationery, toys, sports goods, sports equipment, agricultural tools and marine tools.

These products are usually prepared by plastic processing methods such as injection molding, blow molding, compression molding, transfer molding, rotating molding, slush molding, inflation tubular film process, and extrusion molding.

As plastics processing are conducted at high temperatures above 200° C., additives, monomers, decomposed materials in the plastics are changed to carbonized materials such as tar, pitch and other colored sticky substances, which are apt to adhere to the surface of the screw, barrel and die of the plastic processing machine to cause transfer of the carbonized materials to the molded product.

The above mentioned transfer makes the surfaces of molded products dirty and makes the dimensions of the molded products inaccurate, resulting in failure to perform expected moving or structual functions, therefore cleaning the screw, barrel and die of the plastic processing machine has been required.

In case of production changes from specific colored molded articles to non-colored or other colored molded articles, cleaning the screw, barrel and die has been also required to avoid crosscontamination caused by specifically colored resin compound residue.

However, there are some problems with the conventional method of cleaning the screw, barrel and die.

One conventional cleaning method involves dismantling the plastic processing machine, resulting in exposing the screw, barrel and die the outside. Then the carbonized material or colored materials adhered to the surface of the screw, barrel and die is removed using a separating tool such as knife.

However, this method has a defect of exposing operators to high temperatures for long times, which often causes some operators to suffer skin burns or electric shock.

In the case of large sized plastic processing machines, dismantling is impossible.

There are known other conventional cleaning methods in which uncolored thermoplastic resin such as low density polyethylene is passed through the inside of plastic processing machines.

However such methods cannot remove contaminants entirely even if used over extended times. Moreover, such methods generate a large amount of mixed product consisting of contaminants and resin, which scarcely find use as a recycled resin compound.

Another cleaning method involves using a resin composition containing an inorganic powder such as calcium carbonate which exerts improved effects on the removal of colored contaminants.

However, this method causes new problems of the inorganic power remaining in the plastic processing machine.

Another cleaning method also has attempted to use a resin composition consisting of a thermoplastic resin such as low density polyethylene and a surface active agent such as sodium stearate or polyoxyethylene nonylphenyl ether having the effect of lowering interface tension. However, the colored contaminants were scarcely removed.

Based on the above mentioned knowledge, new cleaning methods have been disclosed in Japanese Kokai Patents (H2180941 and H753774), in which a resin composition consisting of uncolored thermoplastic resin and a calcium salt of an organic boron compound having SP3 hybridization orbitals. This resin composition maintains a certain amount of abrasive properties.

However, the method does not exert a sufficient effect of removing colored contaminants.

SUMMARY OF THE INVENTION

As a result of diligent investigation during the course of the present, the present invention provides a resin composition for purging away contaminants in plastic processing machines which resin composition comprises a thermoplastic resin and a specific borate ester of polyoxyalkylene. The present invention further provides a method of purging contaminants in plastic processing machines which involves passing said resin composition through the inside of the plastic processing machines.

DETAILED DESCRIPTION OF THE INVENTION

The borate ester of polyoxyalkylene used for the present invention is a chemical compound expressed by the following general formula (1).

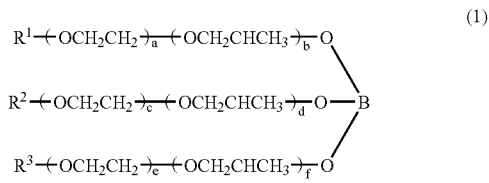

(1)

wherein R1, R2 and R3 are independently selected from the group consisting of hydrogen and hydrocarbons, a, b, c, d, e and f are positive integers independently selected from 0 to 30 whose sum is from 6 to 80.

Examples of the hydrocarbons are alkyl groups such as methyl, ethyl, propyl, isopropyl, butyl, pentyl, hexyl, octyl, nonyl, decyl, dodecyl, hexadecyl, octadecyl and docosyl groups and phenyl, tolyl and cyclohexyl groups.

Illustrative of the borate ester of polyoxyalkylene are the chemical compound expressed by the following chemical formula from (2) to (27).

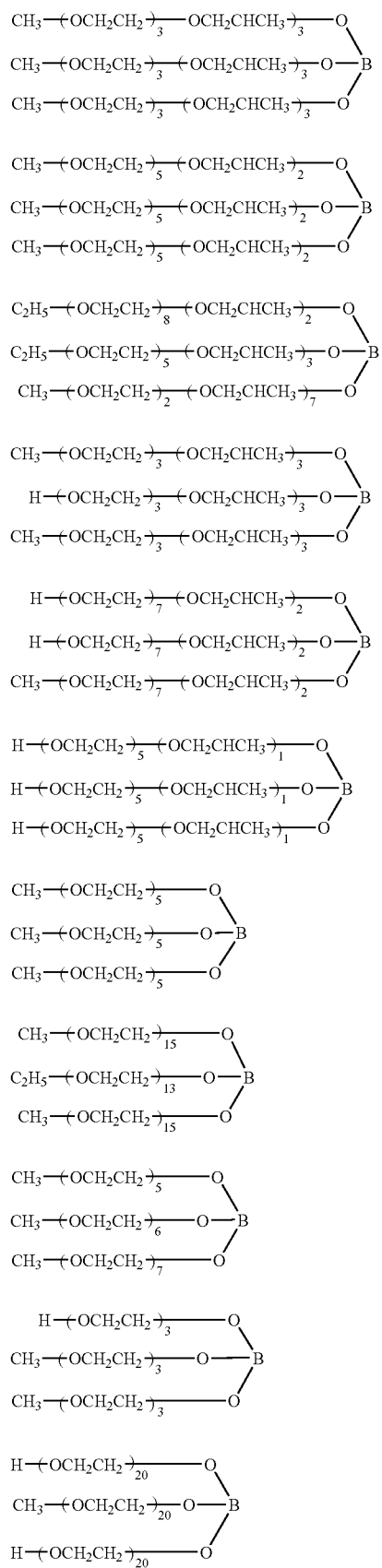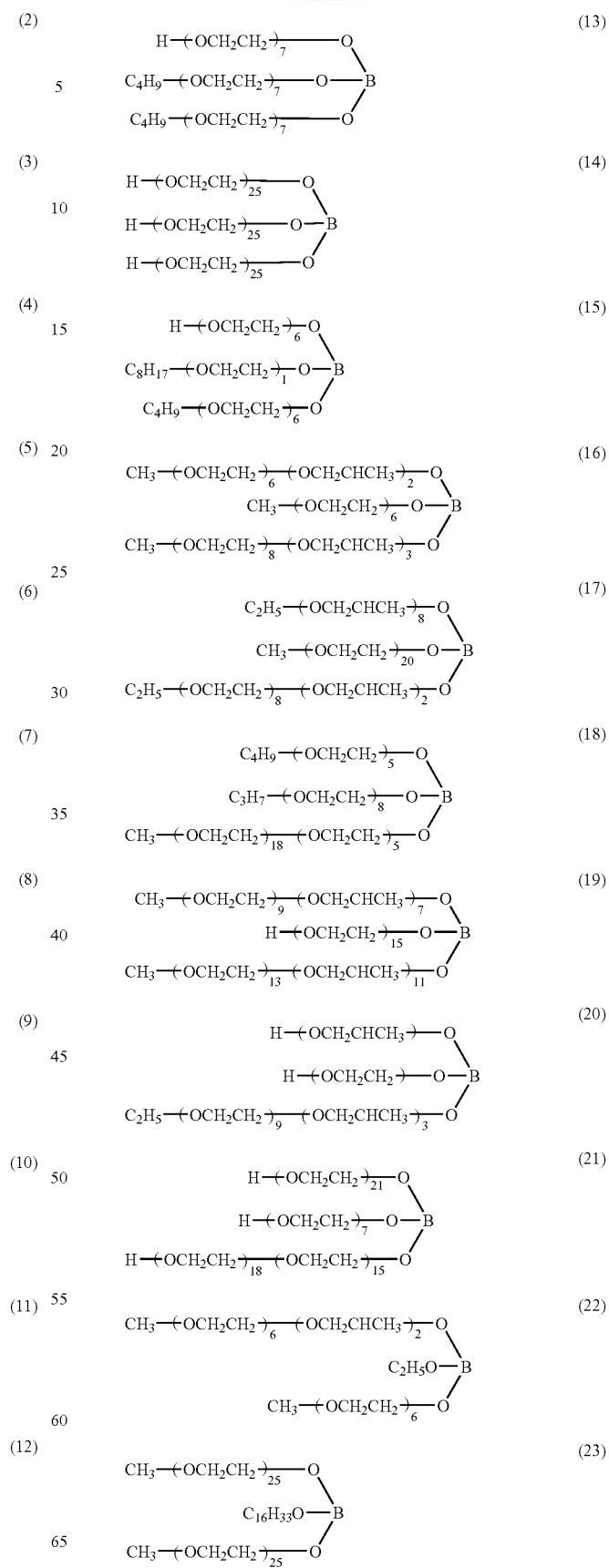

-continued

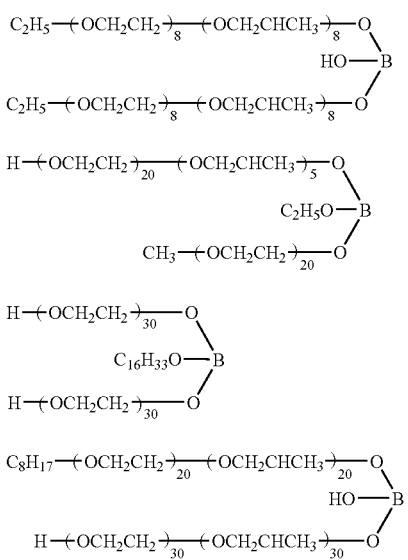

Production methods for the borate esters of polyoxyalkylene used for the present invention are not limited to any specific method; however, following method is preferred.

The borate esters of polyoxyalkylene are produced by esterification-dehydration or ester-exchange reaction by contacting polyoxyalkylene expressed by the chemical formula (28) with boric acid or borate esters of lower alcohols such as methyl alcohol or ethyl alcohol.

It is preferable that the reaction is carried out using 1 mol of boric acid or borate esters of lower alcohols with from 3 to 3.5 moles of polyoxyalkylene expressed by the chemical formula (28).

If the mole ratio is less than 3, undesirable byproducts of borate esters having two or three boron atoms are generated.

The other byproducts or unreacted polyoxyalkylene may be remained in the borate esters unless they hinder the purging effect of the resin compositions of the present invention.

wherein $R^1$ and $R^2$ are independently selected from the group consisting of hydrogen and hydrocarbons, a and b are independently selected from 0 to 30.

Examples of the hydrocarbons are alkyl groups such as methyl, ethyl, propyl, isopropyl, butyl, pentyl, hexyl, octyl, nonyl, decyl, dodecyl, hexadecyl, octadecyl and docosyl groups and phenyl, tolyl and cyclohexyl groups.

Examples of the polyoxyalkylene expressed by the chemical formula (28) are as follows:
diethylene glycol monomethyl ether,
diethylene glycol monoethyl ether,
diethylene glycol monoisopropyl ether,
diethylene glycol monobuthyl ether,
diethylene glycol monoocthyl ether,
diethylene glycol monodecyl ether,
diethylene glycol monohexadecyl ether,
diethylene glycol monooctadecyl ether,
triethylene glycol monomethyl ether,
triethylene glycol monoethyl ether,
triethylene glycol monoisopropyl ether,
triethylene glycol monobuthyl ether,
triethylene glycol monobuthyl ether,
triethylene glycol monoocthyl ether,
triethylene glycol monodecyl ether,
triethylene glycol monohexadecyl ether,
triethylene glycol monooctadecyl ether,
tetraethylene glycol monocmethyl ether,
tetraethylene glycol monoethyl ether,
tetraethylene glycol monoisopropyl ether,
tetraethylene glycol monobuthyl ether,
tetraethylene glycol monoocthyl ether,
tetraethylene glycol monodecyl ether,
tetraethylene glycol monohexadecyl ether,
tetraethylene glycol monooctadecyl ether,
polyethylene glycol monomethyl ether,
polyethylene glycol monoethyl ether,
polyethylene glycol monoisopropyl ether,
polyethylene glycol monobuthyl ether,
polyethylene glycol monoocthyl ether,
polyethylene glycol monodecyl ether,
polyethylene glycol monohexadecyl ether,
polyethylene glycol monooctadecyl ether,
dipropylene glycol monomethyl ether,
dipropylene glycol monoethyl ether,
dipropylene glycol monoisopropyl ether,
dipropylene glycol monobuthyl ether,
dipropylene glycol monoocthyl ether,
dipropylene glycol monodecyl ether,
dipropylene glycol monohexadecyl ether,
dipropylene glycol monooctadecyl ether,
tripropylene glycol monomethyl ether,
tripropylene glycol monoethyl ether,
tripropylene glycol monoisopropyl ether,
tripropylene glycol monobuthyl ether,
tripropylene glycol monoocthyl ether,
tripropylene glycol monodecyl ether,
tripropylene glycol monohexadecyl ether,
tripropylene glycol monooctadecyl ether,
tetrapropylene glycol monomethyl ether,
tetrapropylene glycol monoethyl ether,
tetrapropylene glycol monoisopropyl ether,
tetrapropylene glycol monobuthyl ether,
tetrapropylene glycol monoocthyl ether,
tetrapropylene glycol monodecyl ether,
tetrapropylene glycol monohexadecyl ether,
tetrapropylene glycol monooctadecyl ether,
polypropylene glycol monomethyl ether,
polypropylene glycol monoethyl ether,
polypropylene glycol monoisopropyl ether,
polypropylene glycol monobuthyl ether,
polypropylene glycol monoocthyl ether,
polypropylene glycol monodecyl ether,
polypropylene glycol monohexadecyl ether,
polypropylene glycol monooctadecyl ether,
diethyleneglycol tripropyleneglycol monomethyl ether,
tetraethyleneglycol dipropyleneglycol monomethyl ether,
tetraethyleneglycol tripropyleneglycol monomethyl ether,
tetraethyleneglycol tetrapropyleneglycol monomethyl ether,
pentaethyleneglycol dipropyleneglycol monomethyl ether,
pentaethyleneglycol tripropyleneglycol monomethyl ether,
diethyleneglycol tetrapropyleneglycol monomethyl ether,
hexaethyleneglycol dipropyleneglycol monomethyl ether,
hexaethyleneglycol dipropyleneglycol monomethyl ether,
hexaethyleneglycol tripropyleneglycol monomethyl ether,
hexaethyleneglycol tetrapropyleneglycol monomethyl ether,
hexaethyleneglycol pentapropyleneglycol monomethyl ether,
hexaethyleneglycol hexapropyleneglycol monomethyl ether,
heptaethyleneglycol dipropyleneglycol monomethyl ether, heptaethyleneglycol dipropyleneglycol monomethyl ether,
heptaethyleneglycol tripropyleneglycol monomethyl ether,
heptaethyleneglycol tetrapropyleneglycol monomethyl ether,
heptaethyleneglycol pentapropyleneglycol monomethyl ether,
heptaaethyleneglycol hexapropyleneglycol monomethyl ether,
heptaaethyleneglycol heptapropyleneglycol monomethyl ether,
octaethyleneglycol dipropyleneglycol monomethyl ether,
octaethyleneglycol tripropyleneglycol monomethyl ether,
octaethyleneglycol tetrapropyleneglycol monomethyl ether,
octaethyleneglycol pentapropyleneglycol monomethyl ether,
octaethyleneglycol hexapropyleneglycol monomethyl ether,
octaethyleneglycol heptapropyleneglycol monomethyl ether,
polyethyleneglycol polypropyleneglycol monomethyl ether,
triethylene glycol,
tetraethylene glycol,
pentaethylene glycol,
hexaethylene glycol,
heptaethylene glycol,
octaethylene glycol,
decaethylene glycol,
tridecaethylene glycol,
hexadecaethylene glycol,
eicosaethylene glycol,
pentacosaethylene glycol,
triacosaethylene glycol,
tripropylene glycol,
tetrapropylene glycol,
pentapropylene glycol,
hexapropylene glycol,
heptapropylene glycol,
octapropylene glycol,
decapropylene glycol,
tridecapropylene glycol,
hexadecapropylene glycol,
eicosapropylene glycol,
pentacosapropylene glycol,
triacosapropylene glycol,
triethylene glycol tripropylene glycol,
tetraethylene glycol dipropylene glycol,
tetraethylene glycol tripropylene glycol,
tetraethylene glycol tetrapropylene glycol,
pentaethylene glycol dipropylene glycol,
pentaethylene glycol tripropylene glycol,
hexaethylene glycol dipropylene glycol,
hexaethylene glycol tripropylene glycol,
hexaethylene glycol pentapropylene glycol,
hexaethylene glycol hexapropylene glycol,
heptaethylene glycol dipropylene glycol,
triacosaethylene glycol dipropylene glycol,
heptaethylene glycol tripropylene glycol,
heptaethylene glycol tetrapropylene glycol,
heptaethylene glycol pentapropylene glycol,
heptaethylene glycol hexapropylene glycol,
heptaethylene glycol heptapropylene glycol,
octaethylene glycol dipropylene glycol,
octaethylene glycol tripropylene glycol,
octaethylene glycol tetrapropylene glycol,
octaethylene glycol pentapropylene glycol,
octaethylene glycol hexapropylene glycol,
octaethylene glycol pentapropylene glycol,
octaethylene glycol octapropylene glycol,
polyethylene glycol polypropylene glycol,
tripropylene glycol triethylene glycol monomethyl ether,
tetrapropylene glycol diethylene glycol monomethyl ether,
tetrapropylene glycol triethylene glycol monomethyl ether,
tetrapropylene glycol tetraethylene glycol monomethyl ether,
pentapropylene glycol diethylene glycol monomethyl ether,
pentapropylene glycol triethylene glycol monomethyl ether,
pentapropylene glycol tetraethylene glycol monomethyl ether,
hexapropylene glycol diethylene glycol monomethyl ether,
hexapropylene glycol triethylene glycol monomethyl ether,
hexapropylene glycol tetraethylene glycol monomethyl ether,
hexapropylene glycol pentaethylene glycol monomethyl ether,
hexapropylene glycol hexaethylene glycol monomethyl ether,
heptapropylene glycol diethylene glycol monomethyl ether,
heptapropylene glycol triethylene glycol monomethyl ether,
heptapropylene glycol tetraethylene glycol monomethyl ether,
heptapropylene glycol pentaethylene glycol monomethyl ether,
heptapropylene glycol hexaethylene glycol monomethyl ether,
heptapropylene glycol heptaethylene glycol monomethyl ether
octapropylene glycol diethylene glycol monomethyl ether,
octapropylene glycol triethylene glycol monomethyl ether,
octapropylene glycol tetraethylene glycol monomethyl ether,
octapropylene glycol pentaethylene glycol monomethyl ether,
octapropylene glycol hexaethylene glycol monomethyl ether,
octapropylene glycol heptaethylene glycol monomethyl ether
octapropylene glycol octaethylene glycol monomethyl ether
polypropylene glycol polyethylene glycol monomethyl ether
tripropylene glycol triethylene glycol monomethyl ether,
tetrapropylene glycol triethylene glycol monomethyl ether,
tripropylene glycol triethylene glycol monomethyl ether,
octapropylene glycol diethylene glycol monomethyl ether,
octaethylene glycol dipropylene glycol monomethyl ether,
octaethylene glycol tripropylene glycol monomethyl ether,
octaethylene glycol tetrapropylene glycol monomethyl ether,
octaethylene glycol pentapropylene glycol monomethyl ether,
octaethylene glycol hexapropylene glycol monomethyl ether,
octaethylene glycol heptapropylene glycol monomethyl ether,
octaethylene glycol octapropylene glycol monomethyl ether,
polyethylene glycol polypropylene glycol monomethyl ether.

A solvent or diluent may be incorporated into the raw materials such as boric acid, borate ester of lower alcohols and polyoxyalkylene, or into borate esters of glycol ether.

If a solvent or diluent is employed, they must not disturb the esterification-dehydration or ester-exchange reaction and their boiling point(s) should preferable be below the boiling point of the byproducts or polyoxyalkylenes.

Examples of solvents or diluents are ethers such as diethyl ether, dioxane, tetrahydrofran; aliphatic hydrocarbons such as hexane, acetic anhydride, heptane, octane, nonane, decane, undecane; aromatic hydrocarbons such as benzene, toluene, xylene; cycloalkanes such as cyclohexane, cyclohexene; non-proton polar compounds such as dimethy formamide, dimethyl sulfoxide, hexamethyl polyamide phosphate, acetonitrile, N-methyl pyrrolidone; and their chlorine substituted compounds such as chloroform and carbon tetrachloride.

Catalysts for the esterification-dehydration or ester-exchange reaction may be used.

If a catalyst is necessary for promoting the reaction, following condensation catalysts are recommended.

Examples of catalysts are metallic salts of organic acids such as ferrous octanoate, ferrous naphthenate, cobaltous naphthenate, manganese octanoate, stannum octanoate, stannum naphthenate, lead octanoate, lead naphthenate, organotin compounds such as dibuty tin diacetate, dibutyl tin dioctanoate, dibutyl tin dilaurate, dibutyl tin dioleate, dibutyl tin dimethoxide, oxidized dibutyl tin; metal alcoholates such as tetrabutyl titanate, tetrabutyl zirconate; titanium chelates such as di-isopropoxybis-acetyl acetonate titanium, 1,3-propanedioxy bis-ethylacetonate titanium, 1,3-propanedioxy bis-ethylacetoacenate titanium; aluminum chelates such as aluminum acethyl-acetonate, aluminum tris-ethylacetoacetonate; amines such as hexyl amine, dodecylamine phosphate, dimethyl hydroxyamine, diethyl hydroxyamine; tetra-ammonium salts such as benzyl hydroxyamine; inorganic acids such as hydrochloric acid, nitric acid, sulfuric acid, phosphoric acid; organic acid such as acetic anhydride, pure acetic acid (over 99.8%), propionic acid, citric acid, benzoic acid, formic acid, acetic acid, oxalic acid, p-toluenesulfonic acid; chlorosilanes such as methyl tri-chlorosilane, dimethyl di-chlorosilane; inorganic bases such as aqueous ammonia; organic bases such as ethylene diamine, tri-ethanol amine; and amino alkylamine.

It is preferable that the esterification-dehydration or ester-exchange reaction is carried out under conditions of at reduced or atmospheric pressures and at a temperature of from 50 to 250° C. temperature, and preferably from 100 to 180° C.

Removal of byproducts such as lower alcohols or water can precede the reaction easily because removal of byproducts precedes the reaction equilibrium and favor borate ester of polyoxyalkylenes formation.

As to the removal methods, azeotropic distillation using an azeotropic agent and batch or continuous distillation using a distillation tower are preferable.

For the purpose of improving the properties of the borate ester of polyoxyalkylenes, amino group containing compounds and/or solvents may be added to said borate esters of polyoxyalkylenes.

Adding the amino group containing compounds to the borate esters of polyoxyalkylenes suppresses borate ester hydrolysis and also provides a rust preventive effect under the conditions of the presence of water or its vapor.

Examples of the amino-group containing compounds include alkylamine, cycloalkylamine, alkanol amine, heterocyclic amine, diamine, lactam, cyclic imide and poly-amine, which may be used alone or combination.

As the alkyl amine, there can be used methyl amine, dimethyl amine, trimethyl amine, ethyl amine, diethyl amine, tri-ethyl amine, propyl amine, N, N-di[poly(4)oxyethyl] hexadecyl amine, dodecyl dimethyl amine, stearamide propyl dimethyl amine, polyoxyethylene(3–30) octadecyl amine, polyoxyethylene(3–30)laurylamine, polyoxyethylene (3–30) oleyl amine, polyox-yethylene(3–30) dilauryl amine, polyoxyethylene (3–30) stearyl amine, polyoxyethylene(3–30)alkylamine, polyoxyethylene(3–30) daily amine, and di(oleoyloxyethyl)hydroxy amine.

As the cycloalkyl amine, there can be used cyclohexyl amine, methyl cyclohexyl amine and ethyl cyclohexyl amine.

As the alkanol amine, there can be used ethanol amine, diethyl hydroxy methyl amine, diethanol amine, dimethyl amino-ethanol, triethanol amine, propanolamine, dimethy 2-hydroxypropyl amine, buthanol amine, methyldi(2-hydroxyethyl) amine, tri(2-hydroxyethyl)amine, hydroxymethyl di(2-hydroxyethyl)amine, dibenzil 2-hydroxypropyl amine and cyclohexyl di(2-hydroxyethyl) amine.

As the cycloalkanol amine, there can be used cyclohexanol amine, methylcyclohexanol amine and ethylcyclohexanol amine.

As the heterocyclic amine, there can be used pyridine, lutidine, 3,4-xylidine,piperidine, N-methyl piperidine and N-ethyl piperidine.

As the lactam, there can be used propio lactam, N-methylpropio lactam, N-ethyl butlyrolactam, N-methyl varero lactam, N-methyl caprolactam and phenyl caprolactam.

As the cyclic imide, there can be used succinimide, N-methyl succinimide, N-ethyl succinimide, phenyl succinimide and 2-undecyl imidazoline.

As the diamine, there can be used ethylene diamine, triethylene diamine and tetraethylene diamine.

As the polyamine, there can be used diethylene triamine, triethylene tetra-mine and pentaethylene pentamine.

Among these amino-group containing compounds, tertiary amino-group containing compounds exhibit excellent effects of preventing hydrolysis of borate ester of polyoxyalkylene and promoting the cleaning and purging the colored contaminants.

Examples of tertiary amino-group containing compounds having the above mentioned excellent properties are polyoxyethylene (3–30) octadecyl amine, polyoxyethylene (3–30) laurylamine, polyoxyethylene (3–30) oleyl amine, polyoxyethylene (3–30) dilauryl amine, polyoxyethylene (3–30)stearyl amine, polyoxyethylene (3–30) alkylamine, polyoxyethylene (3–30) dialkyl amine and di(oleoyloxyethyl) hydroxy amine.

The amount of amino-group containing compound to 100 parts by weight of borate ester of polyoxyalkylene is from 0 to 100 parts by weight, and preferably from 5 to 50 parts by weight and most preferably from 10 to 30 parts by weight.

Use of a solvent contributes to lower viscosity of the borate ester of polyoxyalkylene.

As a solvent, there can be used water, methyl alcohol, ethyl alcohol, isopropyl alcohol, butyl alcohol, isopropyl ether, ether, ethylene glycol, polyethylene glycol, polyethylene dimethyl ester, diethylene glycol, triethylene glycol, ethylene glycol dimethyl ether, diethylene glycol dimethy ether, diethylene glycol diethy ether, ethylene glycol dipropyl ether, triethylene glycol dimethyl ether, triethylene glycol monobutyl ether, diethylene glycol monobutyl ether, diethylene glycol diethyl ether, diethylene glycol propyl ether, diethylene glycol dibutyl ether, dimethyl ether, propylene glycol, acetone, methyethyl ketone, furfural, dioxane, methane sulfonate, diethy ether, tetra hydrofuran, hexane, acetic anhydride, heptane, octane, nonane, decane, undecane, benzene, toluene, xylene, cyclohexane, cyclohexene, dimethyl formamide, dimethy sulfoxide, hexamethyl triamide phosphate, acetonitrile, N-methyl pyrrolidone, chloroform and carbon tetrachloride and the solvents are used by alone or combination.

The amount of solvent to 100 parts by total weight of borate ester of polyoxy-alkylene and amino-group containing compound is from 0 to 100 parts by weight, and preferably from 5 to 50 parts by weight and most preferably from 10 to 30 parts by weight.

Ingredients other than the amino-group containing compounds and/or solvents may be incorporated into borate ester of polyoxyalkylene for the purpose of improving the properties of cleaning and purging the resin compound according to the present invention.

As other ingredients, there can be used stabilizers, neutralizers, antioxidants, ultraviolet absorbers, light stabilizers, antistatic agents, lubricants, processability improving agents, fillers, dispersing agents, coupling agents, anti-copper rusting agents, blowing agents, nuclear forming agents, anti-foaming agents, deformers, colorants, pigments, dying agents, carbon black, water tree preventing agents, voltage stabilizers, anti-tracking agents, organic peroxide, crosslinking agents, disinfectants, antiseptics, anti-mold agents and anti-rust agents.

In the present invention, the resin composition for purging contaminants from a plastic processing machine means a resin composition which is fed from a hopper into the inside of the plastic processing machine to fill the plastic processing machine with the resin composition.

The plastic processing machine had previously been filled with a production resin composition for producing plastic molds or films and the surfaces of screw, barrel and die had became contaminated with the colored sticky contaminant formed by decomposition of the production resin.

In case of long production operations or when production resin compositions are changed for producing other plastic articles, the production resin composition(s) used for previous products and the contaminants produced by long time operation must be purged before newplastic article production in order to prevent cross-contamination.

The resin composition used for purging contaminants and residual, previously used resin composition(s) is fed into the plastic processing machine after previous plastic article production is over.

The resin composition used for purging may be continuously fed into the processing machine or stopped after the plastic processing machine is filled.

After the processing machine is filled with the resin composition used for purging, then the heat source is switched off and the machine temperature is lower to room temperature and the resin composition remains in the processing machine for a sufficient time such as from 6 to 48 hours to contact with contaminants and residue of previously used production resin composition(s).

When the next plastic mold or film will be produced, the new production resin composition for next plastic mold or film will be fed into the plastic processing machine. Then any remaining resin composition having contaminants absorbed therein will be purged.

The resin used for the resin composition of present invention is the thermoplastic resin.

As the thermoplastic resin, there can be used high density polyethylene, high pressure low density polyethylene such as HP-LDPE, EVA, EEA, Ionomer, olefin vinylalcohol copolymer, LLDPE, VLDPE, polypropylene (PP), polystyrene (PS), acrylonitrile-butadiene-styrene copolymer (ABS), acrylonitrile-stylene copolymer (AS), acrylonitrile-butadiene copolymer, acrylonitrile acrylate-styrene copolymer, polyvinyl chloride (PVC), polyamide, polymethylmethacrylate(PMMA), polyacetal (POM), aminopolyacrylamide, polyarylate, fluorocarbon resin, polyimide(PI), polyamino-bismaleimide (PABI), polyamideimide (PAI), polyetherimide (PEI), bismaleimidetriazine resin(BT), polysulfone, polybutylene terephthalate (PBT), polyethylene terephthalate (PET), polyvinylidene chloride, polycarbonate (PC), polyvinyl acetate, polyvinyl alcohol, polyvinyl ether, polyvinyl formate, modified PPE, modified polyphenyleneoxide (PPO), polyphenylene sulfide (PPS), polyethersulfone (PESF), polyetheretherketone (PEEK), polyarysulfone (PAS), polymethylpentene (TPX), liquid crystal polymer, silicone resin, natural rubber (NR), butyl rubber (IIR), acrylonitrile-butadiene rubber (NBR), chloroprene rubber (CR), styrene butadiene rubber (SBR), butadiene rubber (BR).

The method of producing the resin compositions for purging away contaminants according to the present invention is not limited to any specific method; however, the following method is desirable.

To the 100 parts by weight of a thermoplastic resin, 0.1~10 parts by weight of a borate ester of glycol ether expressed by general formula (1) is added.

The thermoplastic resin may be in the form of a powder or in pellet form.

The borate ester of polyoxyalkylene may be soaked into thermoplastic resin powder or pellets.

It is desirable to conduct the soaking at a temperature of over the glass transition point so that the soaking speed is fast.

Another method for producing purge resin compositions of the present invention may be conducted as follows.

The thermoplastic resin and borate ester of polyoxyalkylene are fed into a plastic processing machine or bunbury mixer, in which they are blended and extruded through a pelletizing die having many holes of 3~7 mm diameter.

Each extruded string is cut to form pellets having a length of 3~7 mm.

If the amount of the borate ester of polyoxyalkylene is less than 0.1 parts by weight, the resin composition for purging does not exhibit the cleaning and purging effect. If on the other hand, the amount of the borate of polyoxyalkylene is more than 10% parts by weight, a uniform polymer blend is barely obtained.

EXAMPLE

Now, the resin compositions for purging away contaminants in a plastic processing machine according to the present invention will be described in further detail with reference to specific Examples. However, it should be understood that the present invention is by no means restricted by such specific Examples.

Example 1

Borate ester of polyoxyalkylene expressed by chemical formula (2) was obtained by following synthesis process.

In a 7000 ml flask equipped with three inlet pipes and displaced by nitrogen gas were charged 146 g (1 mole) of triethyl borate [$B(OC_2H_5)_3$], 1.2 g of dibutyl tin dilaurate and 50 ml of benzene.

Subsequently, to the solution in the flask 996 g (3 mole) of tripropyleneglycol triethylenglycol monomethyl ether were added under stirring conditions to obtain a uniform blended solution.

Subsequently, the solution in the flask was stirred for 13 hours at 95° C. under distillation conditions to remove ethanol and benzene as the byproduct and to obtain 1002 g (0.99 mole) of a borate ester of polyoxyalkylene expressed by chemical formula (2).

In a vessel, 99.0 parts by weight of a high pressure low density polyethylene (made by Nippon Unicar Company Ltd., melt mass flow rate 1.2 g/10 min., density 0.923 g/cm3)

and 1.0 parts by weight of borate ester of polyoxyalkylene expressed by chemical formula (2) obtained by above mentioned method were blended for 5 minutes at room temperature to obtain a mixture. Then the mixture was thrown into a continuous blending extruder (made by K.C.K. Company Ltd., machine name K.C.K 80×2–35 VEX type) to produce a resin composition for purging away a contaminant in a pellet form having a length of 3 mm and a diameter of 3 mm. The resin composition was named hereafter purge resin composition (1).

Subsequently, the purging effect evaluation test was conducted by following procedure.

A dry-blend was prepared by blending 95 kg of a non-colored low density polyethylene pellets (made by Toso Company Ltd., PETLOSENE 183) with 5 kg of color master batch (made by Tokyo Ink Company Ltd., PEX 3152, blue colored). Then the obtained dry-blend of 100 kg was thrown to the hopper of an extuder having a 65 mm diameter screw. Then the dry-blend was fed into extruder to be heat-kneaded.

After 100 kg of the dry-blend were passed through the extruder, the purge resin composition (1) for purging away contaminants of the present invention obtained by above mentioned method was fed to the same extruder and passed through until the residue of above mentioned color master batch which was stuck or adhered to the surfaces of the screw and barrel was purged.

This procedure is called as decolorization.

As the blank test, the decolorization test were conducted except that the resin composition for purging away contaminants of the present invention was exchanged by the non-colored linear low density polyethylene pellets (made by Toso Company Ltd., FS240A).

Also, comparative purge resin composition I and comparative purge resin composition II were prepared for comparative decolorization tests, which were equivalent to the conventional purge resin composition as described in the above "Description of the Related Art" section.

Comparative Purge Resin Composition I

Resin composition I consists of 99.0 weight % of high pressure low density polyethylene (made by Nippon Unicar Company Ltd., melt mass flow rate 1.2 g/10 min., density 0.923 g/cm$^3$) and 1.0 weight % of poly(9)oxyethylene nonylphenyl ether.

Comparative Purge Resin Composition II

Resin composition II consists of 99.0 weight % of a high pressure low density polyethylene (made by Nippon Unicar Company Ltd., melt mass flow rate 1.2 g/10 min., density 0.923 g/cm$^3$) and 1.0 weight % of poly(II)oxyethylene dodecylether sodium sulfate.

Result of Decolorization of Purge Resin Compositional (1)

Each purge resin composition amount used till decolorization was observed were as follows.

Purge resin composition (1) of the present invention . . . 22 kg

Blank test . . . 280 kg

Comparative purge resin composition I . . . 250 kg

Comparative purge resin composition II . . . 230 kg

According to the above results, it can be seen that the purge resin composition (1) was excellent compared to the comparative purge resin compositions, because the amount of purge resin composition (1) used was about 10% of the amount of conventional type purge resin composition used, resulting in cost and time savings.

Example 2

Borate ester of polyoxyalkylenes expressed by chemical formula (8) was obtained by following synthesis process.

In a 7000 ml flask equipped with three inlet pipes and displaced by nitrogen gas were charged 146 g (1 mole) of triethyl borate [$B(OC_2H_5)_3$], 1.2 g of dibutyl tin dilaurate and 50 ml of benzene.

Subsequently, to the solution in the flask were 756 g (3 mole) of pentylethyleneglycol monomethyl ether was added under stirring conditions to obtain a uniform blended solution.

Subsequently, the solution in the flask was stirred for 13 hours at 95° C. under distillation conditions to remove ethanol and benzene as the by-product and to obtain 758 g (0.99 mole) of a borate ester of polyoxyalkylene expressed by chemical formula (8).

In a vessel, 99.0 parts by weight of a high pressure low density polyethylene (made by Nippon Unicar Company Ltd., melt mass flow rate 1.2 g/10 min., density 0.923 g/cm3) and 1.0 parts by weight of borate ester of glycol ether expressed by chemical formula (8) obtained by above mentioned method and 1.0 parts by weight of polyoxyethylene (9) lauryl amine were blended for 5 minutes at room temperature to obtain a mixture. Then the mixture was thrown into a continuous-blending-extruder (made by K.C.K. Company Ltd., machine name K.C.K 80×2–35 VEX type) to produce a resin composition for purging away a contaminant in a pellet form having a length of 3 mm and a diameter of 3 mm.

The resin composition was named hereafter purge resin composition (2).

Subsequently, the purging effect evaluation test was conducted by following procedure.

A dry-blend was prepared by blending 95 kg of a non-colored low density polyethylene pellet (made by Toso Company Ltd., PETLOSENE 183) with 5 kg of color master batch (made by Tokyo Ink Company Ltd., PEX 3152, blue colored) Then the obtained dry-blend of 100 kg was thrown into the hopper of an extuder having a 65 mm diameter screw. Then the dry-blend was fed into the extruder to be heat-kneaded.

After 100 kg of dry-blend were passed through the extruder, the purge resin composition (2) for purging away contaminants of the present invention obtained by above mentioned method was fed into the same extruder and passed through until the residue of above mentioned color master batch which was stuck or adhered to the surface of the screw and barrel was purged.

Result of Decolorization of Purge Resin Composition (2)

Each purge resin amount used until decolorization was observed were as follows.

Purge resin composition (2) of the present invention . . . 20 kg

Blank test . . . 280 kg

Comparative purge resin composition I . . . 250 kg

Comparative purge resin composition II . . . 230 kg

According to the above results, it can be seen that purge resin composition (2) of present invention was excellent compared to the other purge resins, because the amount of purge resin composition of the present invention used was about 10% of the amount of conventional purge resin compositions used, resulting in cost and time savings.

What is claimed is:

1. A resin composition for purging away contaminants in a plastic processing machine which resin composition comprises:
    (A) 100 parts by weight of a thermoplastic resin; and
    (B) 0.1–10 parts by weight of a borate ester of polyoxyalkylene expressed by the following formula (1)

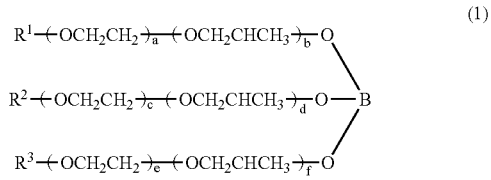

(1)

wherein R1, R2 and R3 are independently selected from the group consisting of hydrogen and a hydrocarbon group, and wherein a, b, c, d, e and f, independently are 0 or positive integers from 1 to 30 with the proviso that the sum of $a+b+c+d+e+f$ is from 6 to 80.

2. A resin composition for purging away contaminants in a plastic processing machine according to claim 1, further comprising:
    C) 0.1–10 parts by weight of an amino-group containing compound.

3. A method of purging contaminants from a plastic processing machine which comprises the steps of:
    A) providing a plastic processing machine having an inner surface that has contaminants thereon from a previous plastic processing step; and
    B) passing the resin composition of claim 1 or 2 through said plastic processing machine so as to purge the contaminants from step A).

* * * * *